US005161772A

United States Patent [19]

DiResta et al.

[11] Patent Number: 5,161,772

[45] Date of Patent: Nov. 10, 1992

[54] STAND FOR PUSH BROOMS AND LIKE IMPLEMENTS

[76] Inventors: Joseph G. DiResta; James D. DiResta, both of 1078 W. Broadway, Woodmere, N.Y. 11598

[21] Appl. No.: 738,100

[22] Filed: Jul. 30, 1991

[51] Int. Cl.[5] .......... F16M 9/00

[52] U.S. Cl. .......... 248/688; 15/111

[58] Field of Search .......... 248/688, 121, 146, 127, 248/351; 15/257 R, 111, 143, 159 R

[56] References Cited

U.S. PATENT DOCUMENTS

| | | | |
|---|---|---|---|
| 270,624 | 1/1883 | Barnett | 248/688 |
| 490,472 | 1/1893 | Clements | 15/111 |
| 539,357 | 5/1895 | Davis | 248/688 |
| 892,525 | 7/1908 | Jorgensen | 248/688 |
| 1,008,104 | 11/1911 | Ball | 248/688 |
| 1,182,139 | 5/1916 | Brown | 248/688 |
| 1,362,177 | 12/1920 | Petrie | 248/688 |
| 1,752,400 | 4/1930 | Sund . | |

FOREIGN PATENT DOCUMENTS

| | | | |
|---|---|---|---|
| 0468889 | 10/1950 | Canada | 248/688 |
| 1030474 | 3/1953 | France | 15/111 |

*Primary Examiner*—Ramon O. Ramirez
*Attorney, Agent, or Firm*—Robert G. Mentag

[57] ABSTRACT

A stand adapted to be attached to a longhandled implement, such as a push broom, a mop, a rake, a floor squeegee and the like, for holding an implement, when it is not being used, on a supporting surface with the handle in a substantial vertical position where it can be quickly grasped for use of the same. The stand includes a leg which may be mounted on the implement handle or on the front end of a part of the body of the implement. The stand leg may be integrally formed with a part of the body of the implement. The stand leg may be adjustably mounted on the implement handle.

6 Claims, 3 Drawing Sheets

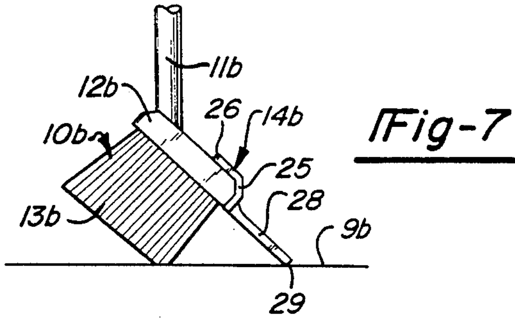
Fig-7
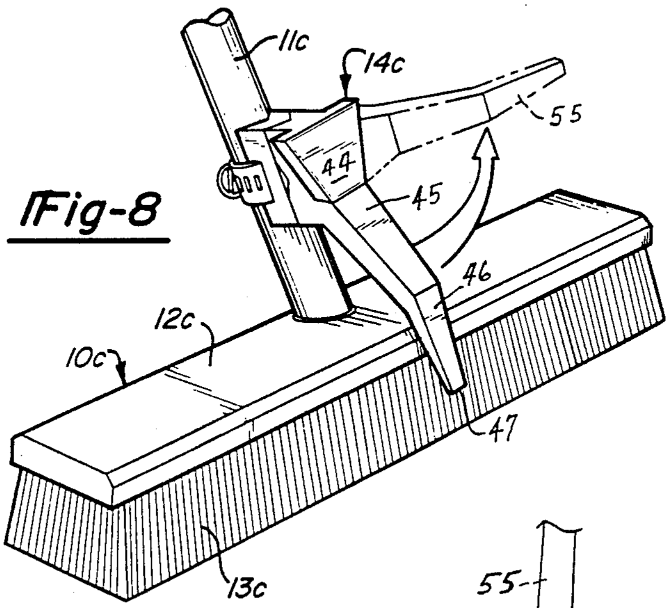
Fig-8
Fig-9
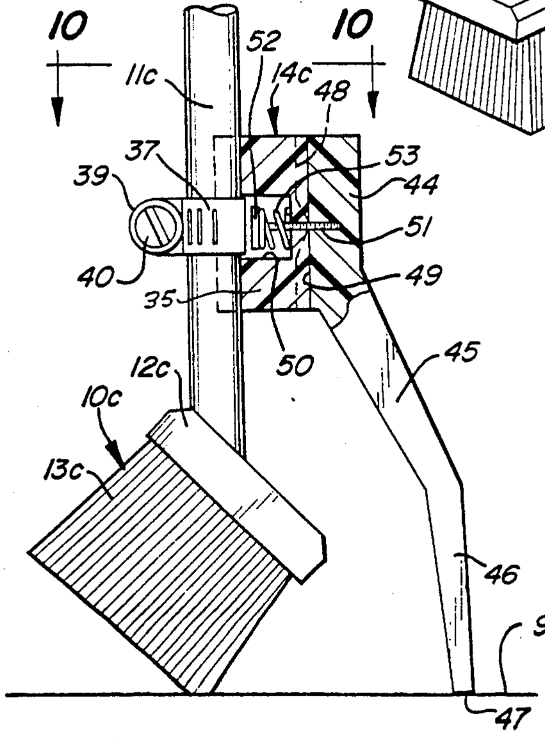
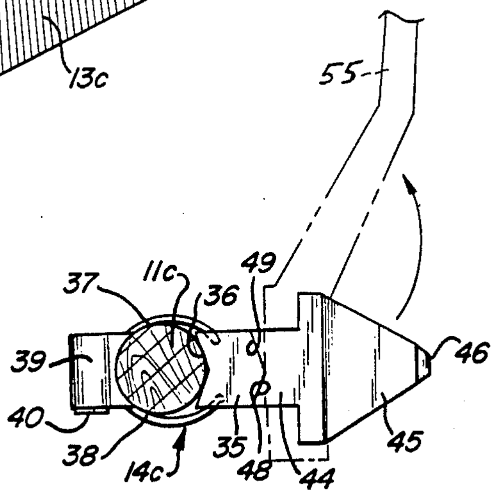
Fig-10

STAND FOR PUSH BROOMS AND LIKE IMPLEMENTS

BACKGROUND OF THE INVENTION

1. Field of the Invention

The field of art to which this invention pertains may be generally located in the class of devices relating to supports. Class 248, Supports, United States Patent Office Classification, appears to be the applicable general area of art to which the subject matter similar to this invention has been classified in the past.

2. Description of the Prior Art

This invention relates generally to push brooms, mops, rakes, floor squeegees, and like longhandled implements. A problem encountered in the use of the aforementioned type implements is that, when the use of such implements is interrupted, or finished, the implement is either dropped to the floor or leaned against a wall or other available vertical support member. If such an implement is dropped on the floor, then when use of the same is renewed, it is necessary to bend down and pick up the implement by the handle. The requirement to bend down many times to pick up such an implement can be the cause of backaches to the user of such a type of implement. If such implements are leaned against a wall, then the wall can be scarred and dirtied. Another disadvantage of dropping such implements on the floor, or leaning them against walls or other support members, is that the handles of the implements can be damaged.

In view of the foregoing, it is an object of the present invention to provide a stand for push brooms, and like longhandled implements which may be quickly and easily attached to such an implement to provide a supporting leg to hold the implement when it is not being used in a position with the handle therof standing upright, without any for supporting the handle against a wall or dropping the handle on the floor.

SUMMARY OF THE INVENTION

The aforegoing object is accomplished by a stand which may be attached to a longhandled push broom, mop, rake, floor squeegee, and like implements. The stand is secured to the longhandled implement and it provides a supporting leg to hold the implement in a balanced position with the handle thereof standing upright. The implement stand includes attachment means connected to the stand leg, for attaching the stand to the implement at a proper balance point, with the stand leg engaging the floor. In some embodiments of the invention, the stand attachment means is releasably attached to the handle of the implement, and in other embodiments of the invention, the stand attachment means is attached to the head board or bristle carrying member of an implement, such as the head board of a push broom.

BRIEF DESCRIPTION OF THE DRAWINGS

FIG. 7 is a side elevation view of the push broom and stand third embodiment structure illustrated in FIG. 6, and showing the stand supporting the push broom with the handle thereof in a vertical position where it can be readily grasped by a user.

FIG. 8 is an elevation perspective view of a fourth embodiment of the invention and showing a stand having a floor engaging stand leg which can be pivoted from an operative position to an inoperative position.

FIG. 9 is a side elevation view of the push broom and stand structure illustrated in FIG. 8, showing the stand partly in section and with a stand leg engaging a floor surface and holding the handle of the push broom in a vertical position where it may be grasped for reuse of the push broom.

FIG. 10 is a horizontal view of the push broom and stand structure illustrated in FIG. 9, partly in section, taken along the 10—10 thereof, and looking in the direction of the arrows.

DESCRIPTION OF THE PREFERRED EMBODIMENTS

Figure 1:
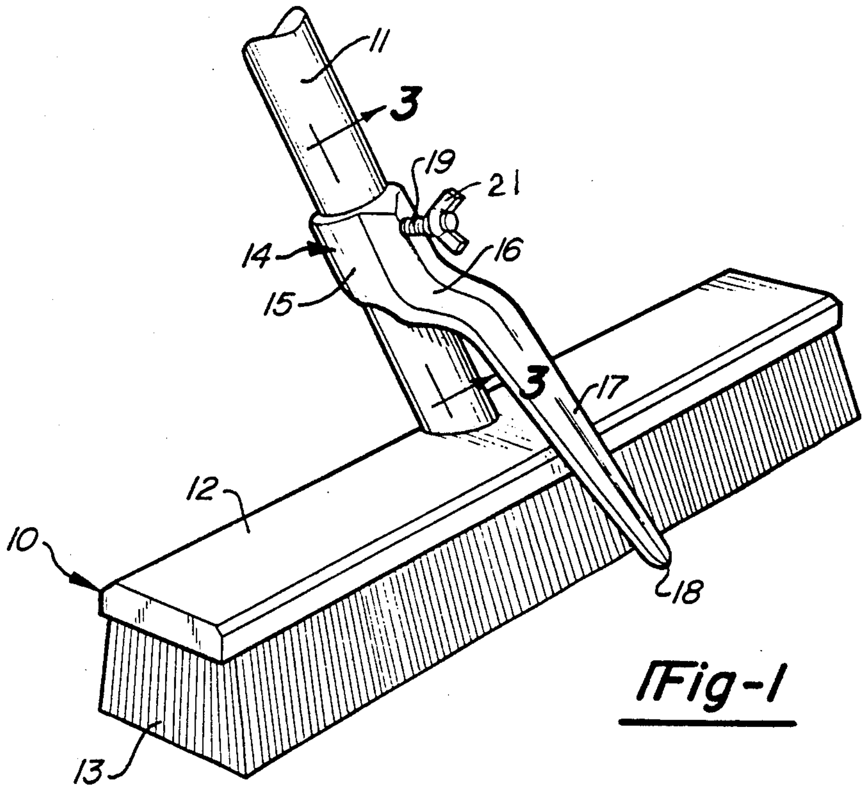
FIG. 1 is an elevation perspective view of a longhandled push broom, and showing a stand for the push broom releasably mounted on the handle and with the push broom in an operative position for sweeping a floor.
Figure 2:
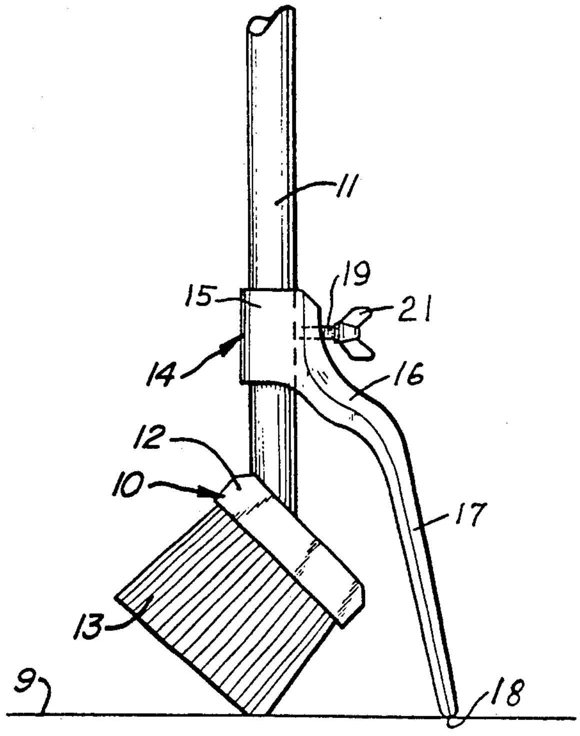
FIG. 2 is a side elevation view of the push broom and stand structure shown in FIG. 1, but with the push broom pivoted to put the handled in a vertical position and with the lower floor engaging end of the stand on the floor to hold the handle of the push broom in a vertical position ready for instant gripping by a user of the push broom.
Figure 3:
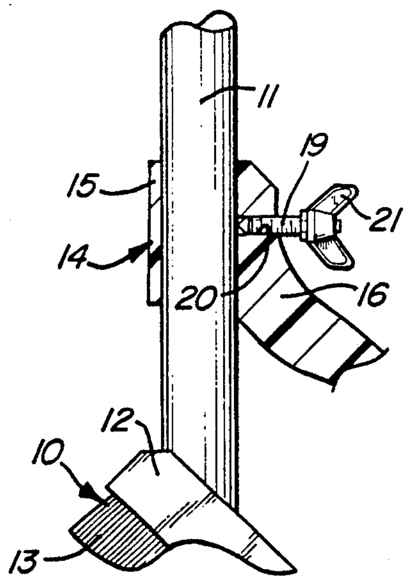
FIG. 3 is a fragmentary elevation view of the push broom and stand structure shown in FIG. 1, taken along the line 3—3 thereof, looking in the direction of the arrows, and showing a portion of the stand in cross section.

Referring now to the drawings, and in particular to FIGS. 1, 2 and 3, the numeral 10 generally designates a conventional push broom provided with a stand made in accordance with the principles of the present invention. The push broom 10 is shown as having the usual long handle 11 which is circular in cross section and has its lower end fixedly mounted in a conventional manner in the transverse head board or bristle carrying member 12. The numeral 13 designates the usual bristle attached to the lower side of the head board 12.

The numeral 14 generally designates a first embodiment of a stand made in accordance with the invention, and which is releasably secured to the handle 11 at a balance point. for holding the push broom in a position with the handle 11 extended upwardly, and in a position for a quickly and easy grasping of the same for use of the push broom. The stand 14 includes an attachment means for attaching the stand to the push broom handle 11, and which comprises an attachment sleeve member 15, which is an open ended tube and is slidably mounted over the handle 11. The stand 14 further comprises a floor engaging leg 17 which has an upper end integrally attached to the tubular attachment sleeve member 15 by an intermediate integral arm portion 16, that holds the floor engaging leg 17 disposed forwardly from the front end of the push broom 10 in a position spaced from the broom head board 12. The leg 17 includes a pointed, lower end 18 for engagement with a floor 9.

A suitable attachment screw 19 is threadably mounted through a threaded bore 20 in the arm portion 16. The attachment screw 19 has a wing shaped handle 21 for rotating the same. The threaded bore 20 extends through the attachment sleeve member 15. The stand 14 is slid upwardly and downwardly on the handle 11 until a proper balance point is reached, and the screw 19 is tightened to lock the stand 14 on the handle 11 so that the push broom 10 can be held in the balanced position shown in FIG. 2. The attachment screw 19 carries out its function when it is rotated in the proper direction to engage the inner end thereof against the push broom handle 11 to lock the stand 14 on the push broom handle 11. The stand 14 may be made from any suitable material, as for example it may be made from a suitable plastic or metal material or other lightweight material.

Figure 4:
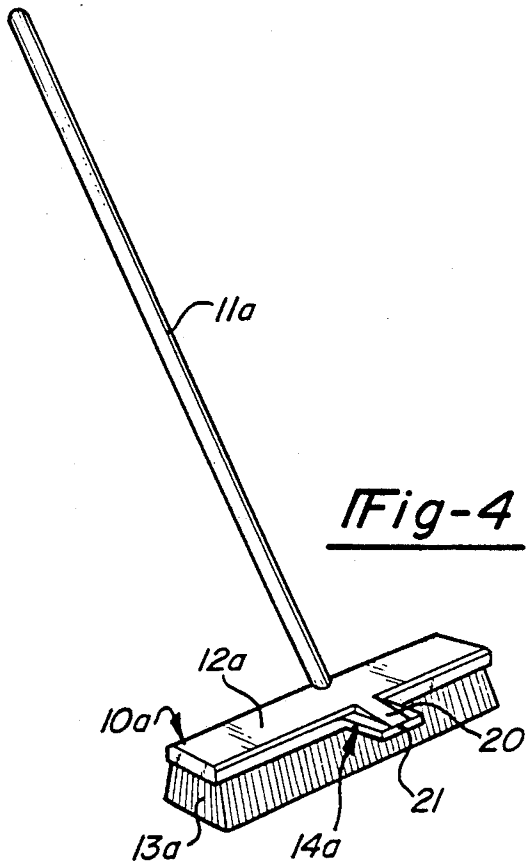
FIG. 4 is an elevation perspective view of a push broom provided with a stand which comprises a second embodiment of the invention, and which second embodiment is integrally attached to the head board or bristle carrying member of the push broom.
Figure 5:
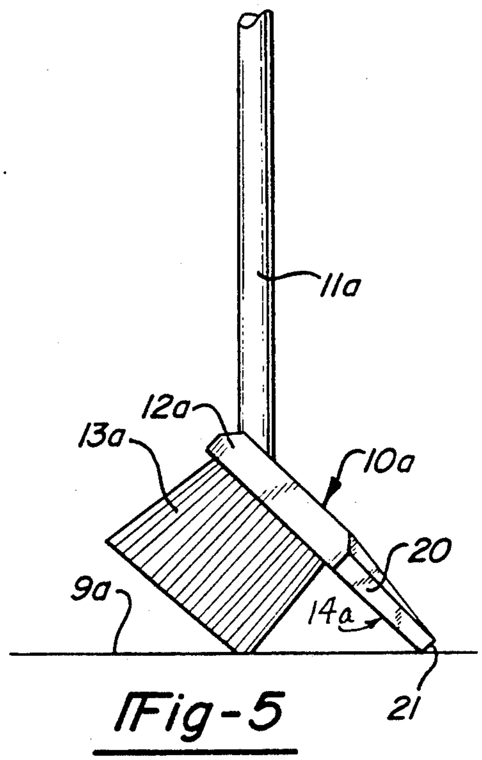
FIG. 5 is a side elevation view of the push broom and stand second embodiment of FIG. 4, but with the push broom handle in a vertical, at rest position, with the handle of the push broom in a position for being readily grasped by a user to continue use of the push broom.

FIGS. 4 and 5 show a second embodiment of the invention wherein a push broom stand **14*a* is integrally attached to a push broom head board 12*a*. The parts of the second embodiment of the invention illustrated in FIGS. 4 and 5 which are the same as the parts of the first embodiment described in FIGS. 1, 2 and 3 have been marked with the same reference numerals followed by the small letter "a". The stand 14*a* is shown as an elongated leg 20 which has a rear end that is integrally attached to the push broom head board or bristle carrying member 12*a*. The stand 14*a* is provided with a floor engaging front end 21. The stand 14*a* would be made from the same material as the head board or bristle carrying member 12*a*, as for example a suitable plastic, wood or like material. The stand 14*a* would be positioned on the front end of the head board or bristle carrying member 12*a* in a transverse central position and in alignment with the handle 11*a*. The stand 14*a* is made to a length to hold the handle 11*a* in a balanced, at rest position as shown in FIG. 5**.

Figure 6:
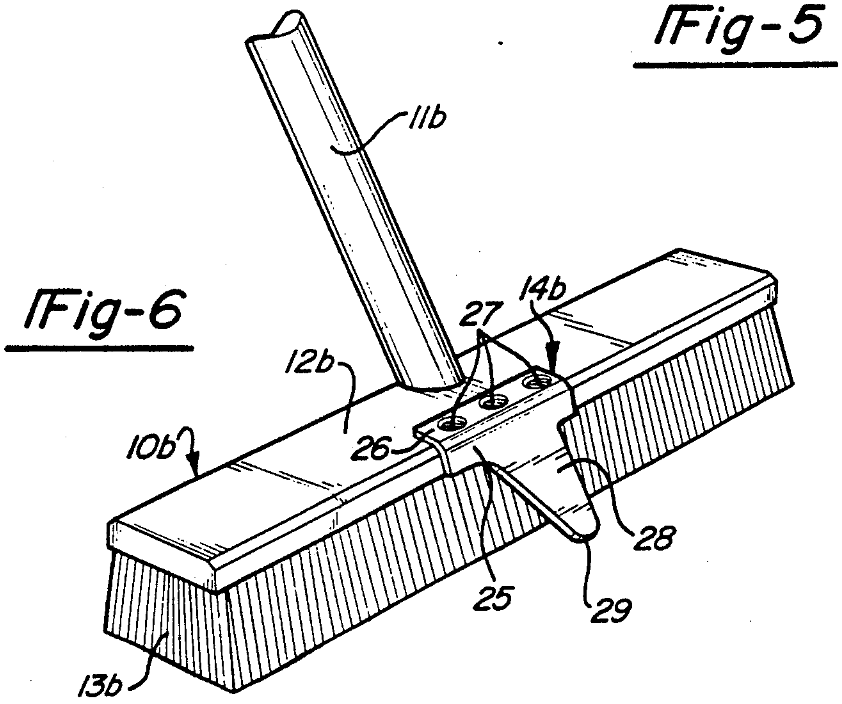
FIG. 6 is an elevation perspective view of a push broom provided with a third embodiment stand made in accordance with the principles of the present invention, and showing the stand detachably mounted to the front end of the head board or bristle carrying member of the push broom.

FIGS. 6 and 7 illustrate a third embodiment of the invention in which a stand **14*b* is mounted on the front end of the head board or bristle carrying member 12*b*. The parts of the third embodiment of the invention illustrated in FIGS. 6 and 7 which are same as the parts of the first embodiment of FIGS. 1, 2 and 3** have been marked with the same reference numerals followed by the small leter "b".

As shown in FIGS. 6 and 7, the push broom stand **14*b* includes an elongated floor engaging leg 28 which has a triangular shape, in plan view. The leg 28 has a rounded front end 29 for engaging the floor 9*b*. The rear end of the stand leg 28 is integrally formed with a substantially L-shaped attachment member having a front end flange portion 25 integrally formed with the rear end of the leg 28. The attachment member also includes a rear end flange portion 26 integrally attached to the flange portion 25 to form the L-shaped attachment member. The attachment member flange portion 26 sits on the top surface of the head board or bristle carrying member 12*b*, in the central position along the front end of said head board. The attachment member flange portion 25 seats against the front edge of the push broom head board 12*b*. The attachment member flange portion 26 is releasably secured to the top side of the push broom head board 12*b* by a plurality of suitable screws 27. The stand 14*b* may be made from any suitable material, as for example any suitable plastic, wood or metal material. The stand 14*b* supports the push broom in the position shown in FIG. 7, with the handle 11*b* in a vertical push broom balanced condition, whereby the handle 11*b* may be readily grasped by a user for use of the push broom 10*b***.

FIGS. 8, 9 and 10 illustrate a fourth embodiment of the invention in which the stand **14*c* is provided with a rotatably mounted leg that is rotatable between an operative position and an inoperative position. The parts of the fourth embodiment of the invention illustrated in FIGS. 8, 9 and 10 which are the same as the parts of the first embodiment described in FIGS. 1, 2 and 3 have been marked with the same reference numerals followed by the small letter "c". The stand 14*c*is shown as being mounted on the handle 11*c*, on the front side thereof, however, it will be understood that it could be swung 180 degrees around and mounted on the rear side of the handle 11*c*** for use in that position.

As shown in FIGS. 9 and 10, the stand **14*c* includes an attachment means comprising a block shaped member 35 which has an angled vertical recess 36 formed on the rear side thereof for seating against the round surface of the push broom handle 11*c*. The attachment block 35 is secured to the handle 11*c* by a pair of C-shaped clamp arms 37 and 38 which ech have one end thereof fixedly mounted in the attachment block 35, by any suitable means, and the other ends thereof operatively mounted in a conventional clamp body 39. The clamp arms 37 and 38 are adapted to be tightened to hold the attachment block 35 on the handle 11*c* by a conventional clamp tightener screw 40 which is operatively mounted in the clamp body 39 and which engages slots in the outer ends of the clamp members 37 and 38. Any suitable clamp means may be used to releasably hold the attachment block 35 on the push broom handle 11*c***.

The stand **14*c* includes a floor engaging leg which includes an upper end portion 44, an intermediate, downwardly and forwardly angled portion 45, and an integral lower end portion 46 which angles downwardly and forwardly and has a floor engaging lower end 47. As shown in FIG. 10, the leg upper end portion 44 has an angled, recessed end surface 49 which seats on and mates with a pointed end 48 on the attachment block 35. The leg upper end portion 44 is held in the operative position shown in FIGS. 8, 9 and 10 by a spring and threaded rod arrangement shown in FIG. 9. The spring and threaded rod arrangement includes an elongated threaded rod 51 which has one end mounted in a suitable threaded bore (no number) in the rear end of the leg upper end portion 44. The other end of the threaded rod 51 is extended into a recess 50 in the attachment block 35, and it has an enlarged head 52 formed theron. A coiled spring 53 is mounted around the rod 51 between the rod head 52 and the front end of the recess 50**.

If the stand embodiment **14*c* of FIGS. 8, 9 and 10, is mounted on the rear side of the push broom handle 11*c*, the operator or user of the push broom 10*c* may move the stand leg 44–46 to a horizontal position, as shown in FIG. 8 by the numeral 55, whereby the stand leg would not hit the floor when the push broom 10*c* is being used in a normal manner. When it is desired to support the push broom 10*c* on the floor engaging leg of the stand 14*c* the leg may be kicked down from the broken line position 55 to the solid line position shown in FIG. 8 to permit the lower end 47** of the stand leg to engage a floor in a push broom supporting position.

It will be seen, that the stand elongated leg in each of the four embodiments is disposed at an obtuse angle relative to the longitudinal axis of an implement handle, as is clearly seen in FIGS. 2, 5, 7 and 9. The head board 12 may also be termed a body.

What is claimed is:

1. The combination, with a longhandled implement (10,10*a*, 10*b*, 10*c*) having a body (12,12*a*, 12*b*, 12*c*) with a front side, of a stand (14,14*a*, 14*b*, 14*c*) for supporting the longhandled implement in a balanced position on a supporting surface (9,9*a*, 9*b*, 9*c*), when the longhandled implement is not being used, with the implement long handle (11) in a substantial vertical position, and said stand (14) comprising:

(a) an elongated leg (17,20,28,45) having a lower end (18,21,29,47) for engagement with a supporting surface (9,9*a*, 9*b*, 9*c*) simultaneously with engagement of the implement (10) with the supporting surface (9,9*a*, 9*b*, 9*c*), in a position laterally spaced apart from the front end of the implement body (12,12*a*, 12*b*, 12*c*), and with the implement (10) long handle (11,11*a*, 11*b*, 11*c*) in said vertical position; and, (b) attachment means for mounting the elongated leg (17,20,28,45) in association with the longhandled implement, (10,10*a*, 10*b*, 10*c*) at an obtuse angle relative to the longitudinal axis of the implement long handle (11,11*a*, 11*b*, 11*c*).

2. The combination with a longhandled implement (10*a*), of a stand (14*a*) as defined in claim 1, wherein:

(a) said elongated leg (20) is formed integral with the body (12*a*) of the longhandled implement (10*a*), on the front side thereof.

3. The combination with a honghandled implement (10*b*), of a stand (14*b*) as defined in claim 1, wherein:

(a) said elongated leg (28) is separately made and is detachably mounted on a part of the body (12*b*) of the longhandled implement (10*b*), at the front side thereof.

4. The combination with a longhandled implement (10,10*c*), of a stand (14,14*c*) as defined in claim 1, wherein:

(a) said elongated leg (17,45) is separately made; and, (b) said attachment means (15,19) (35–40,44,48–52) releasably secures the elongated leg (17,45) to the handle (11,11*c*) of the longhandled implement (10,10*c*), with the elongated leg (17,45) disposed on the front side of the longhandled implement body (12,12*c*).

5. The combination with a longhandled implement (10), of a stand (14) as defined in claim 4, wherein:

(a) said attachment means includes a tubular attachment sleeve member (15), formed integral with the elongated leg (17), and slidably mounted on the implement long handle (11), and a lock member (19) on said tubular attachment sleeve member (15) for releasably locking the tubular attachment sleeve member (15) on the implement long handle (11).

6. The combination with a longhandled implement (10*c*), of a stand (14*c*) as defined in claim 4, wherein:

(a) said attachment means includes an attachment block (35) on which the elongated leg (45) is rotatably mounted to permit the elongated leg (45) to be swung to an inoperative horizontal position; and, (b) said attachment means further includes a clamp (37–40) for releasably locking the attachment block (35) on the implement long handle (11*c*).

* * * * *